US007383722B2

(12) United States Patent
Tsuyuki et al.

(10) Patent No.: US 7,383,722 B2
(45) Date of Patent: Jun. 10, 2008

(54) FUEL VAPOR TREATMENT SYSTEM WITH LEAK DIAGNOSING

(75) Inventors: Takeshi Tsuyuki, Yokohama (JP); Takane Hayashi, Yokohama (JP); Hiroya Ishii, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 421 days.

(21) Appl. No.: 11/261,488

(22) Filed: Oct. 31, 2005

(65) Prior Publication Data

US 2006/0137437 A1 Jun. 29, 2006

(30) Foreign Application Priority Data

Dec. 27, 2004 (JP) ............................ 2004-376925

(51) Int. Cl.
*G01M 15/00* (2006.01)

(52) U.S. Cl. ...................................... 73/49.7; 73/118.1

(58) Field of Classification Search .................... 73/40, 73/46, 47, 49.7, 116, 117.2, 117.3, 118.1, 73/119 R See application file for complete search history.

(56) References Cited

U.S. PATENT DOCUMENTS 7,272,488 B2 * 9/2007 Hayashi et al. ............. 701/114
2002/0139173 A1 * 10/2002 Kano et al. .................. 73/49.7
2003/0051540 A1 * 3/2003 Morinaga et al. .......... 73/118.1
2005/0039525 A1 * 2/2005 Wakahara et al. ......... 73/118.1
2005/0044942 A1 * 3/2005 Amano et al. ............. 73/118.1
2005/0262932 A1 * 12/2005 Hayashi et al. ............ 73/118.1
2006/0130568 A1 * 6/2006 Ishii et al. ................. 73/118.1

FOREIGN PATENT DOCUMENTS

JP 2001/012316 A 1/2001
JP 2003/056416 A 2/2003

* cited by examiner

*Primary Examiner*—Eric S McCall
(74) *Attorney, Agent, or Firm*—Global IP Counselors, LLP

(57) ABSTRACT

A fuel vapor purge system is configured to execute a highly accurate leak diagnosis with respect to a fuel vapor leak. After the engine is stopped, the temperature of the fuel vapor rises temporarily and then decreases until it reaches the outside ambient temperature. During this period, the purge line is closed off and a purge line pressure decreasing rate is detected when the purge line pressure is slightly above atmospheric pressure. The detected purge line pressure decreasing rate is then compared to a threshold value. The purge system is diagnosed as "normal" if the purge line pressure decreasing rate is equal to or larger than the threshold value and as "leaking" if the purge line pressure decreasing rate is less than the threshold value.

15 Claims, 4 Drawing Sheets

FUEL VAPOR TREATMENT SYSTEM WITH LEAK DIAGNOSING

CROSS-REFERENCE TO RELATED APPLICATIONS

This application claims priority under 35 U.S.C. § 119 to Japanese Patent Application No. 2004-376925. The entire disclosure of Japanese Patent Application No. 2004-376925 is hereby incorporated herein by reference.

BACKGROUND OF THE INVENTION

1. Field of the Invention

The present invention relates generally to a fuel vapor treatment system configured to be used with an internal combustion engine for an automobile. More specifically, the present invention relates a fuel vapor treatment system equipped with a leak diagnosing system.

2. Background Information

A conventional fuel vapor treatment system for an internal combustion engine is configured to direct fuel vapor produced in a fuel tank into a canister so as to allow the fuel vapor to be temporarily adsorbed. The fuel vapor adsorbed in the canister is then sent to an air intake system of the internal combustion engine by introducing fresh air into the canister through a fresh air introducing port and allowing the fresh air and fuel vapor to be drawn into the air intake system through a purge control valve. In this way, fuel vapors are prevented from being released to the outside air.

However, if a crack develops in the piping of the purge line running from the fuel tank to the canister and from the canister to the purge control valve, or if a poor seal occurs at a joint portion of the piping, then fuel vapor will leak out and the fuel vapor treatment system will not be able to sufficiently prevent the release of fuel vapor to the outside air.

In response to the possibility of such a leak, leak diagnosing systems have been contrived that are configured to determine if fuel vapor is leaking from the purge line. One such leak diagnosing system is disclosed in Japanese Laid-Open Patent Publication No. 2003-56416. In the system disclosed this publication, the purge line is closed off after the engine is stopped by closing the purge control valve and closing a fresh air introducing port on/off valve that is arranged and configured to open and close the fresh air introducing port (which is open to the atmosphere). After the purge line is closed off, the purge line pressure rises in accordance with a temperature rise and the leak diagnosing system detects the purge line pressure repeatedly at a prescribed frequency (once per prescribed amount of time). The leak diagnosing system determines that the purge line is normal if a summation value of the detected purge line pressures is equal to or larger than a threshold value and that the purge line is leaking if the summation value is smaller than the threshold value.

Another leak diagnosing system is disclosed in Japanese Laid-Open Patent Publication No. 2001-12316. This leak diagnosing system is configured to introduce a prescribed negative pressure to the purge line when a diagnosis condition is satisfied while the engine is running and then close off the purge line. The leak diagnosis system determines if a leak exists based on the rate of change of the purge line pressure after the purge line is closed off.

In view of the above, it will be apparent to those skilled in the art from this disclosure that there exists a need for an improved leak diagnosing system. This invention addresses this need in the art as well as other needs, which will become apparent to those skilled in the art from this disclosure.

SUMMARY OF THE INVENTION

It has been discovered that in the leak diagnosing system disclosed in Japanese Laid-Open Patent Publication No. 2003-56416, when the fuel temperature is high, the amount of evaporated fuel is large and the amount by which the purge line pressure rises will be large even if a leak exists. Consequently, there is the possibility that the summation value of the detected purge line pressures will exceed the threshold value even though a leak exists and the purge line will be incorrectly diagnosed as "normal."

Additionally, since the leak diagnosing system disclosed in Japanese Laid-Open Patent Publication No. 2001-12316 can only execute the leak diagnosis while the engine is running, there are restrictions on the conditions for executing the diagnosis in order to avoid such problems as the effects of sloshing (i.e., excessive vaporization caused by vibration).

The present invention was conceived in view of these unresolved issues. One object of the present invention is to provide a leak diagnosing system for a fuel vapor treatment system that can perform a highly precise leak diagnosis when the engine operation is stopped (i.e., when the engine is not running).

Basically, a leak diagnosing system of the present invention is configured to close off the purge line after engine operation is stopped, calculate a purge line pressure decreasing rate at which the purge line pressure decreases in response to the temperature decrease that occurs after the engine is stopped, and determine the leakage degree of the purge line based the calculated rate of decrease of the purge line pressure. More spcefically, a leak diagnosing system of the present invention includes a canister, a fresh air introducing port, a purge line, a pressure detecting device and a leak diagnosis control device. The canister is configured to temporarily adsorb fuel vapor from a fuel tank. The fresh air introducing port is fluidly connected to the canister to introduce fresh air into the canister with a fresh air introducing port on/off valve disposed in the fresh air introducing port to open and close the intake air introducing port of the canister. The purge line is fluidly connected to the canister to send the fuel vapor adsorbed in the canister to an air intake system of an internal combustion engine by introducing fresh air into the canister through the fresh air introducing port and allowing the fresh air and fuel vapor to be drawn into the air intake system through a purge control valve disposed in the purge line. The pressure detecting device is arranged and configured to detect a purge line pressure within the purge line. The leak diagnosis control device is configured and arranged to operatively control the purge control valve and the fresh air introducing port on/off valve so as to close the purge control valve and the fresh air introducing port on/off valve to close off the purge line after determining engine operation is stopped. The leak diagnosis control device includes a pressure decrease rate calculating section and a leak diagnosing section. The pressure decrease rate calculating section is configured to calculate a purge line pressure decreasing rate at which the purge line pressure decreases in accordance with a temperature decrease occurring after the engine is stopped. The leak diagnosing section is configured to conduct a leak determination to determine a leakage state of the purge line based on the purge line pressure decreasing rate of the purge line pressure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
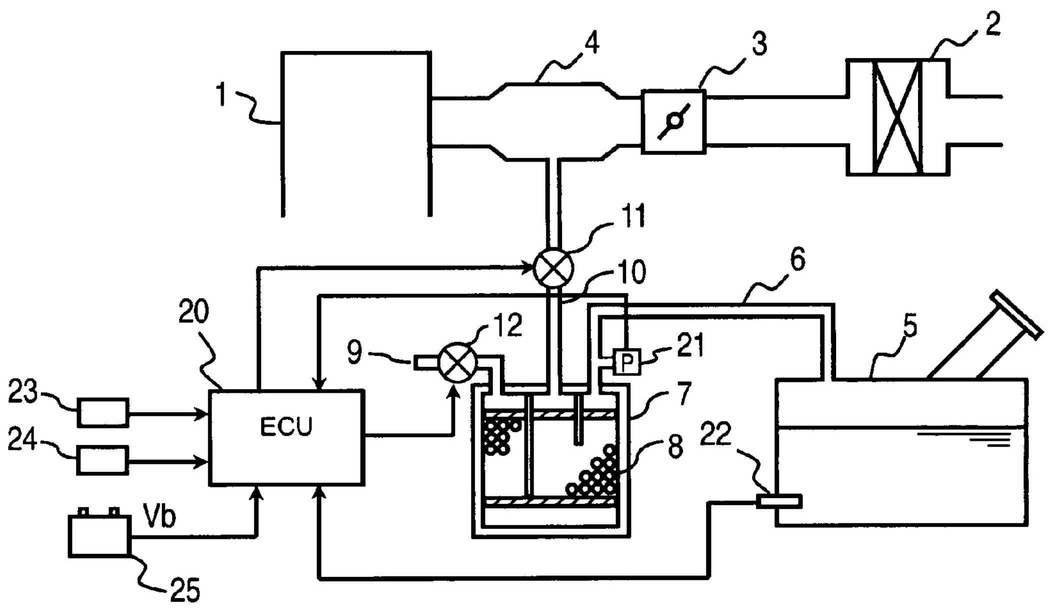
FIG. 1 is a schematic view of a portion of an engine utilizing a fuel vapor treatment system in accordance with a preferred embodiment of the present invention.

Referring initially to FIG. 1, a portion of an internal combustion engine 1 is illustrated that utilizes a fuel vapor treatment system in accordance with a first embodiment of the present invention. The internal combustion engine 1 has an air intake system that includes an air cleaner 2, a throttle valve 3, and an intake air manifold 4 in that order from an upstream end to a downstream end. A fuel injection valve or injector (not shown) is provided in each of the cylinders to supply fuel to the cylinders from the fuel tank 5 in a conventional manner.

The fuel vapor treatment system is fluidly connected between the intake air manifold 4 of the engine 1 and the fuel tank 5. The fuel vapor treatment system basically includes a fuel vapor guide passage 6 that is arranged to guide fuel vapor produced in the fuel tank 5 to a canister 7. The canister 7 is configured to temporarily adsorb the fuel vapor produced in the fuel tank 5. For example, the canister 7 contains a fuel adsorbing material 8 (e.g., activated carbon or other adsorbing material) that temporarily adsorb the fuel vapor. The canister 7 is provided with a fresh air introducing port 9 that opens to the atmosphere and a purge passage 10 that leads out of the canister 7. The purge passage 10 connects to the air intake manifold 4 at a position downstream of the throttle valve 3. A purge control valve 11 is provided at an intermediate position along the purge passage 10. The purge control valve 11 is configured to open in response to a signal sent from an engine control unit or "ECU" 20. The passages 6 and 10 together with the connecting portion of the canister 7 effectively form a purge line from the fuel tank 5 to the air intake manifold 4.

When the engine 1 is stopped (not running), fuel vapor generated inside the fuel tank 5 is guided by the fuel vapor guide passage 6 to the canister 7 and adsorbed. When the engine 1 is started and a prescribed purge allowance condition is satisfied, the purge control valve 11 is opened and the intake vacuum of the engine 1 acts on the canister 7, causing fresh air to be drawn into the canister 7 through the fresh air introducing port 9. The fresh air causes the adsorbed fuel vapor to be released and flow into the purge passage along with the fresh air, the fresh air and fuel vapor forming a purge gas. The purge gas is drawn into the air intake manifold 4 and then combusted inside the combustion chambers of the engine 1.

A component element of the leak diagnosing system of the fuel vapor treatment system is a fresh air introducing port on/off valve 12 that is provided in the fresh air introducing port 9 of the canister 7 and that is configured to open and close the fresh air introducing port 9. The fresh air introducing port on/off valve 12 is a non-throttling valve that either opens or closes the fresh air introducing port 9 of the canister 7.

When a prescribed leak diagnosis condition is satisfied, the engine control unit 20 controls the purge control valve 11 and the fresh air introducing port on/off valve 12, and then conducts the leak diagnosis. In order to conduct the leak diagnosis, the engine control unit 20 receives signals from a pressure sensor 21, a fuel temperature sensor 22, and an outside air temperature sensor 23. The engine control unit 20 also receives an ON/OFF signal from an engine key switch 24 and a signal indicating a power supply voltage or battery voltage Vb from a battery 25 and uses these signals to determine if the lead diagnosis condition is satisfied.

The pressure sensor 21 is arranged to face into the purge passage 10 so that it can detect a pressure P (absolute pressure) in the purge line that funs from the fuel tank 5 to the purge control valve 11 via the canister 7.

The fuel temperature sensor 22 is arranged to face into the fuel tank 5 so that it can detect the fuel temperature Tf.

The outside air temperature sensor 23 is arranged to so that it can detect the outside (ambient) air temperature Ta.

Figure 2:
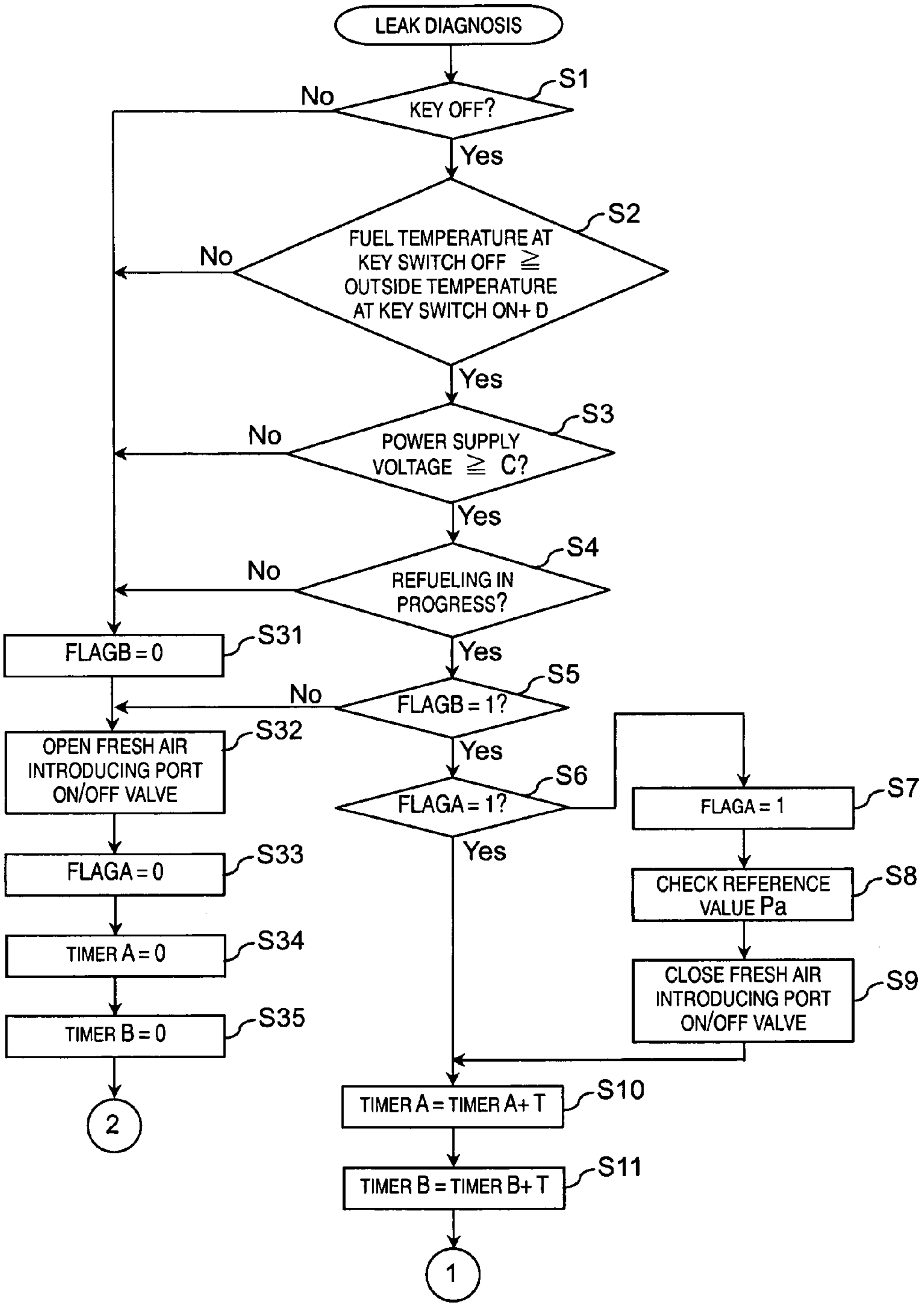
FIG. 2 is a control flowchart showing a first half of a control routine that is executed for performing a leak diagnosis in accordance with the present invention.
Figure 3:
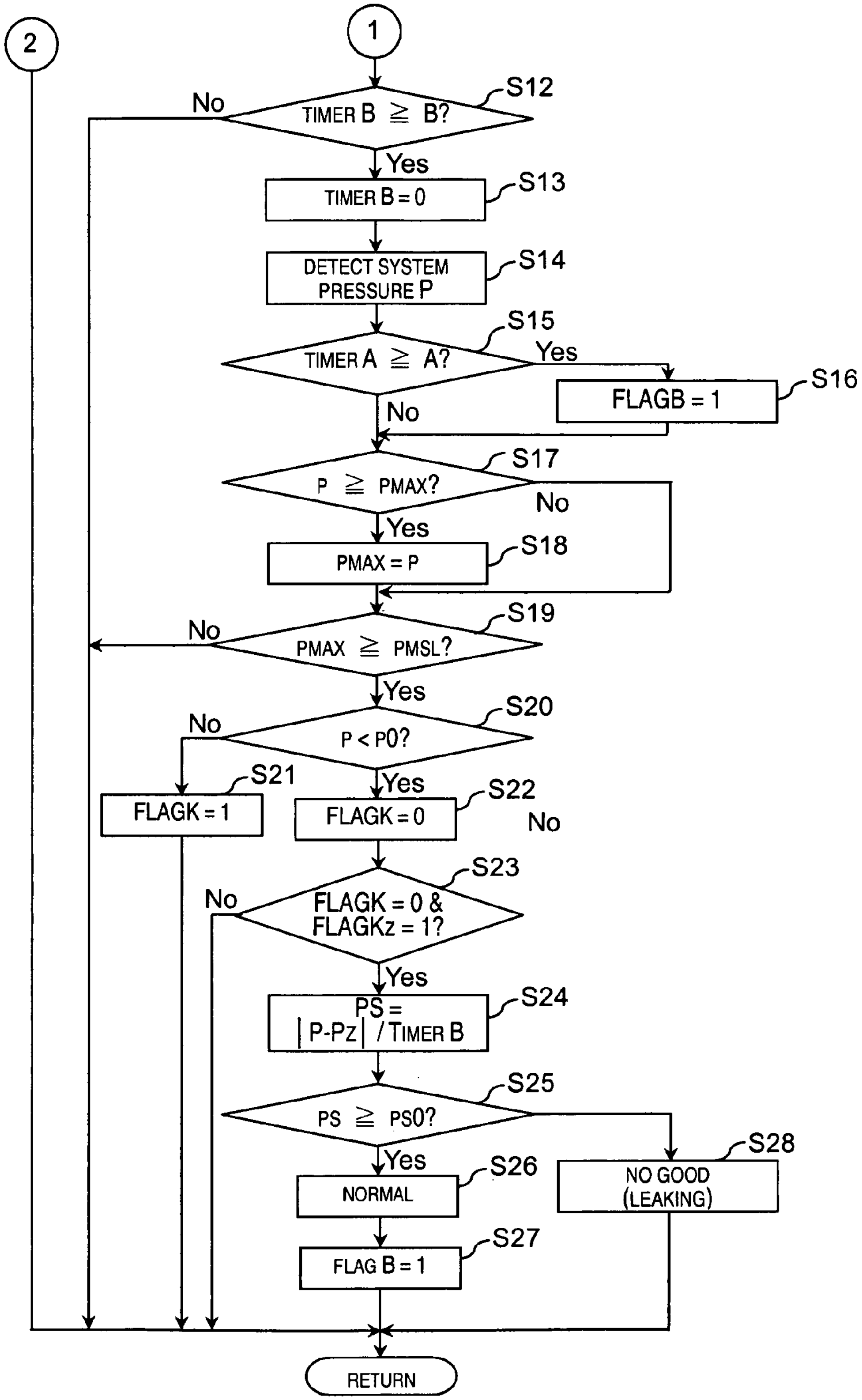
FIG. 3 is a control flowchart showing a latter or second half of a control routine that is executed for performing a leak diagnosis in accordance with the present invention.

The control routine executed by the engine control unit 20 in order to diagnose the leakage state of the fuel vapor treatment system will now be described with reference to the flowcharts shown in FIGS. 2 and 3 and the time chart shown in FIG. 4. Since the leakage determination in this control routine is executed while the vehicle is stopped, a highly accurate leak diagnosis can be accomplished based on a purge line pressure decreasing rate in response to a temperature decrease after the engine is stopped. Thus, the accuracy of the leak diagnosis is not easily degraded by the operating conditions and the accuracy of the leak diagnosis can be ensured. Also, the frequency with which the diagnosis is executed can be increased because the leak diagnosis can be executed every time the engine is stopped.

In step S1, the engine control unit 20 is configured to determine if the engine key switch 24 has been turned OFF. If the engine is running and the engine key switch 24 is ON, the engine control unit 20 proceeds to step S31 and subsequent steps where it initializes flags and other values.

In step S31, the engine control unit 20 is configured to reset the leak diagnosis complete flag FLAGB to 0.

In step S32, the engine control unit 20 is configured to open the fresh air introducing port on/off valve 12.

In step S33, the engine control unit 20 is configured to reset the diagnosis condition satisfied flag FLAGA to 0.

In step S34, the engine control unit 20 is configured to clear a timer A for measuring the time elapsed since the diagnosis condition was satisfied.

In step S35, the engine control unit 20 is configured to clear a timer B for measuring the time period B during which the pressure change rate is calculated.

If the engine key switch 24 is found to be OFF in step S1, the engine control unit 20 proceeds to step S2.

In step S2, the engine control unit 20 is configured to determine if the fuel temperature Tfs at the time when the engine key switch 24 was turned OFF is higher than the outside ambient temperature Ta at the time when the engine key switch 24 was turned OFF by a prescribed temperature D or more. If the fuel temperature Tfs is found to be higher by the prescribed temperature D or more, then the engine control unit 20 proceeds to step S3 because it can be assumed that when the purge line is closed off, the gas inside the purge line will have a sufficient quantity of heat to ensure a large enough temperature decrease to achieve a highly accurate leak diagnosis based on the purge line pressure decreasing rate of the purge line pressure.

In step S3, the engine control unit 20 is configured to determine if the power supply voltage or battery voltage Vb is equal to or above a prescribed value C. If so, the engine control unit 20 determines that there is sufficient electric power available to start the engine 1 again and proceeds to step S4. If the power supply voltage Vb is below the prescribed value C, the engine control unit 20 proceeds to steps S31 to S36 and ends the control routine.

In step S4, the engine control unit 20 is configured to determine if the vehicle is being refueled by, for example, determining if the rate at which the pressure in the purge line is increasing is equal to or larger than a prescribed value. If the vehicle is not being refueled, the engine control unit 20 proceeds to step S5. If the vehicle is being refueled, the engine control unit 20 proceeds to steps S31 to S35 and ends the control routine.

In step S5, the engine control unit 20 determines if the leak diagnosis has been completed or not by determining if the value of the flag FLAGB is 0 or 1. If the value is 1, then the leak diagnosis is incomplete and the engine control unit 20 proceeds to step S6. If the value is 0, then the leak diagnosis is complete and the engine control unit 20 proceeds to steps S32 to S35, ending the control routine.

In step S6, the engine control unit 20 is configured to determine whether or not it is the first time the control routine has been executed since the diagnosis condition was satisfied by determining if the value of the flag FLAGA is 0 or 1. If the value is 0, then the engine control unit 20 determines that it is the first time and proceeds to step S7.

In step S7, the engine control unit 20 sets the flag FLAGA to 1.

In step S8, the engine control unit 20 is configured to set a reference pressure Pa to be used as a reference pressure value with respect to the pressure inside the purge line during the leak diagnosis. More specifically, the engine control unit 20 reads the pressure currently detected by the pressure sensor 21 while the fresh air introducing port on/off valve 12 is open. The engine control unit 20 uses the detected pressure (which is approximately equal to atmospheric pressure) as the reference pressure Pa when setting the purge line atmospheric pressure P0 used for the diagnosis as described later. When the fresh air introducing port on/off valve 12 is open, the pressure inside the purge line is approximately equal to the atmospheric pressure due to the ability of air to move from the outside to the purge line through the canister 7. If a relative pressure sensor is used as the pressure sensor for detecting the purge line pressure, it is not necessary to detect the reference pressure Pa using the pressure sensor 21.

In step S9, the engine control unit 20 is configured to close both the purge control valve 11 and the fresh air introducing port on/off valve 12 and proceeds to step S10. As a result, the purge line running from the fuel tank 5 to the purge control valve 11 through the canister 7 is closed off.

Starting from the second time the control routine is executed after the diagnostic conditions are satisfied, the engine control unit 20 will skip from step S6 to step S10 because the value of the flag FLAGA is 1.

In step S10, the engine control unit 20 is configured to increment the value of the timer A (which serves to measure the time elapsed since the diagnosis condition was satisfied) by the cycle period T, i.e., by the time required to execute the control routine once.

In step S11, the engine control unit 20 is configured to increment the timer B (which serves to measure the time period B during which the pressure change rate is calculated) by the cycle period T.

In step S12, the engine control unit 20 is configured to determine if the value of the timer B has reached the time period B. If not yet, engine control unit 20 ends the current cycle of the control routine (i.e., returns to step S1). If so, the engine control unit 20 proceeds to step S13 and resets the value of the timer B to 0.

In step S14, the engine control unit 20 is configured to read in the purge line pressure (system pressure) P detected by the pressure sensor 21.

In step S15, the engine control unit 20 is configured to determine if the amount of time elapsed since the diagnosis condition was satisfied, i.e., if the value of the timer A, has reached a prescribed value A at which the diagnosis is to be ended. If the prescribed value A has not yet been reached, the engine control unit 20 proceeds to step S17. If the prescribed value A has been reached, the engine control unit 20 proceeds to step S16 where it sets the value of the flag FLAGB to 1 and then proceeds to step S17.

In step S17, the engine control unit 20 determines if the purge line pressure P is equal to or larger than PMAX. If so, the engine control unit 20 proceeds to step S118, where it updates the value of PMAX to the value of the current purge line pressure P, and proceeds to step S19. Meanwhile, if the engine control unit 20 determines in step S17 that the purge line pressure P is smaller than PMAX, then the engine control unit 20 proceeds directly to step S19. As a result, the latest purge line pressure P continues to be set as the maximum value PMAX so long as the purge line pressure P is rising and when the actual maximum value where the purge line pressure P stops rising and starts falling is reached, that value is set as the maximum value PMAX.

In step S19, the engine control unit 20 is configured to determine if the maximum value PMAX is equal to or larger than a threshold value PMSL. If the maximum value PMAX is less than the threshold value PMSL, then the engine control unit 20 ends the control routine and returns. If the elapsed time reaches the set time A for ending the diagnosis and the maximum value PMAX has still not reached the threshold value PMSL, then step S5 will cause the control routine to end without allowing a diagnosis. In other words, the diagnosis is only permitted when the purge line pressure P rises a prescribed amount such that the amount by which the pressure decreases afterwards as a result of the temperature decrease will be sufficient to ensure a highly accurate diagnosis. More particularly, in cases where the purge line pressure goes negative immediately after the diagnosis is begun, the diagnosis is not executed because it is sometimes impossible to track the purge line pressure as it crosses the atmospheric pressure. Also, the threshold value PMSL is set as the sum of the atmospheric pressure and an amount $\alpha$ in order to take into consideration the measurement variation (error) of the reference pressure (=atmospheric pressure).

If the diagnosis is allowed, the engine control unit 20 proceeds to step S20. In step S20 is configured to determine if the purge line pressure P has fallen due to the decrease in temperature occurring after the engine was stopped to a pressure below a set pressure P0 that is used to set the diagnosis timing. The set pressure P0 is set to a pressure slightly higher than atmospheric pressure by adding an offset pressure po to the reference pressure Pa.

The leak diagnosis system waits until the purge line pressure P is smaller than set pressure P0 and sets the flag FLAGK to 1 in step S21 during the waiting period. When the purge line pressure falls below the set pressure P0, the engine control unit 20 proceeds to step S22.

In step S22, the engine control unit 20 is configured to set the value of the flag FLAGK to 0 and proceeds to step S23.

In step S23, the engine control unit 20 is configured to determine if the current value of the flag FLAGK is 0 and if the previous value of the flag FLAGKz was 1. In other words, the engine control unit 20 is configured to check if the purge line pressure P has just fallen below the reference pressure P0 (i.e., if the purge line pressure P fell below the reference pressure P0 since the previous cycle of the control routine). If so, the engine control unit 20 is configured to determine that the diagnosis timing has been reached and proceeds to step S24.

In step S24, the engine control unit 20 is configured to calculate the purge line pressure decreasing rate PS at which the purge line pressure P is decreasing in terms of absolute pressure.

$$PS=|P-Pz|/\text{Timer } B$$

In this equation, the term Pz is the purge line pressure detected in the previous cycle and the term Timer B is the length of time during which the pressure change rate is calculated (which was measured by the timer TB) within the time period B.

In step S25, the engine control unit 20 is configured to determine if the purge line pressure decreasing rate PS is equal to or higher (larger) than a threshold value PS0. The threshold value PS0 is set in a variable manner such that the larger the volume of the empty space inside the fuel tank 5 (i.e., the volume obtained by subtracting the volume of the remaining fuel measured with a fuel level gauge from the total volume of the tank), the smaller the value of the threshold value PS0.

If the purge line pressure decreasing rate PS is determined to be equal to or higher than PS0, then the engine control unit 20 proceeds to step S26 where it determines that the purge line is normal and not leaking. Then in step S27, the engine control unit 20 then sets the flag FLAGB to 1 and ends the diagnostic routine.

Meanwhile, if the value of the purge line pressure decreasing rate PS is smaller than PS0, then the engine control unit 20 proceeds to step S28 where it determines that the purge line is no good (leaking).

Figure 4:
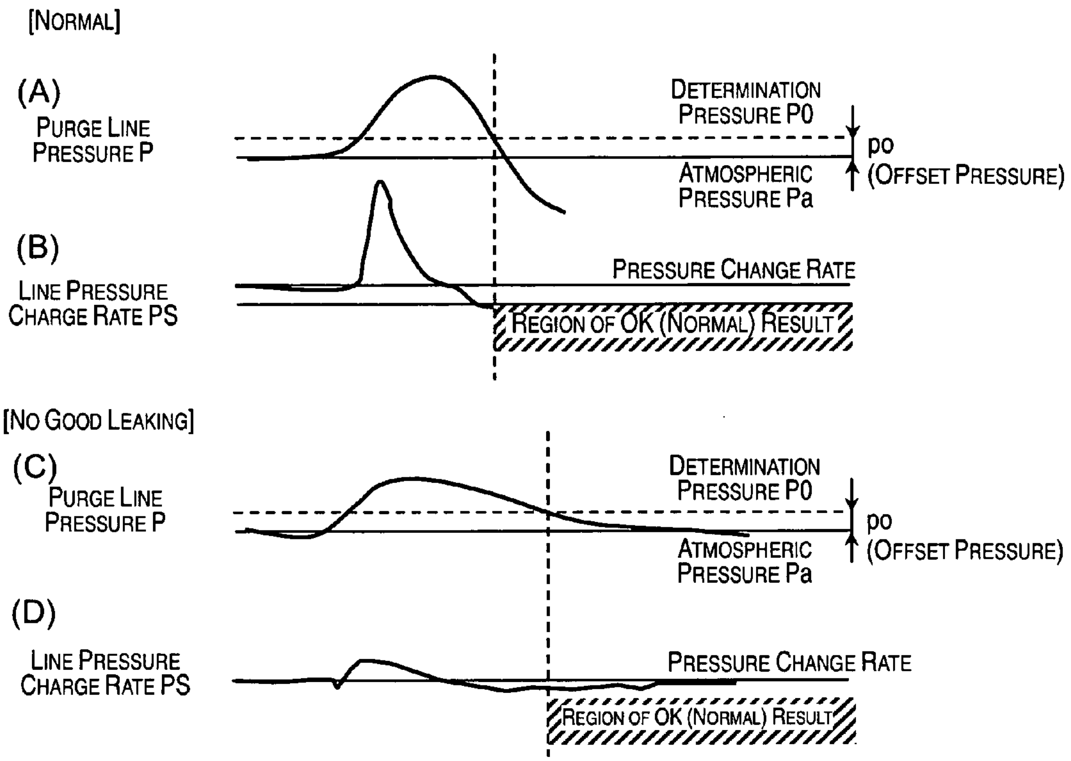
FIG. 4 is a control timing chart showing a pressure behavior that occurs during a leak diagnosis in accordance with the present invention.

FIG. 4 shows how the purge line pressure P and the purge line pressure decreasing rate PS of the purge line pressure P (derivative of purge line pressure P) vary over time during the diagnosis described above.

After the engine 1 is stopped, the temperature inside the engine room rises because the cooling fan stops and this temperature rise causes the purge line pressure P to rise temporarily because the air pressure and fuel vapor pressure inside the fuel tank increase. Afterwards, the fuel tank temperature decreases to the outside ambient temperature due to natural cooling and, accordingly, the purge line pressure P decreases.

When the purge line is normal, the pressure rise is large as shown in plot (A) of FIG. 4 and purge line pressure P falls below atmospheric pressure when the fuel temperature decreases to the outside ambient temperature, which is lower than the fuel temperature that exists immediately after the engine is stopped. Thus, even when the purge line pressure P is in the vicinity of the atmospheric pressure, the purge line pressure decreasing rate PS at which the purge line pressure P decreases will be equal to or larger than a prescribed value if the system is normal (not leaking).

Meanwhile, if the purge line is no good (i.e., leaking), the amount by which the purge line pressure P rises will be small, the rate at which the purge line pressure P decreases will be slow, and the purge line pressure P will converge toward atmospheric pressure. Thus, the purge line pressure decreasing rate PS at which the purge line pressure P decreases falls to near zero when the purge line pressure P is in the vicinity of the atmospheric pressure. Therefore, the purge line can be diagnosed for leakage by comparing the actual purge line pressure decreasing rate PS obtained when the purge line pressure P is at a set pressure P0 to a reference or threshold value PS0.

When the amount of fuel vapor is large, the rate at which the vapor pressure decreases due to condensation is large. Consequently, if the leak diagnosis is executed while the purge line pressure P is high above the atmospheric pressure, there is the possibility that a normal result will be obtained even of the purge line is leaking. Thus, it is preferable from the standpoint of accuracy to execute the leakage determination at a point when the purge line pressure P is in the vicinity of the atmospheric pressure and condensation of the fuel vapor is nearly finished because the rate at which the pressure decreases is readily affected by the amount of fuel vapor during the initial stages of the pressure decrease in the vicinity of the atmospheric pressure. However, since the purge line pressure P converges gradually toward the atmospheric pressure when the purge line is leaking, the diagnosis would require too much time and the amount of electric power consumed during the diagnosis would be large if the system were designed to wait until the purge line pressure P reached the atmospheric pressure. Therefore, by executing the leakage determination when the purge line pressure is slightly higher than the atmospheric pressure, the precision of the diagnosis can be increased while also executing the leakage determination at an earlier timing and reducing the amount of electric power consumed by the diagnosis procedure.

Since the leakage determination is only executed when the difference between the fuel temperature and the outside ambient temperature at the point in time when the engine 1 is stopped is equal to or larger than a prescribed value, a sufficient amount of temperature decrease is ensured and a highly accurate leak diagnosis based on the pressure decrease rate can be accomplished.

Also, since the leakage determination is only executed when the maximum value of the purge line pressure P is equal to or higher than a prescribed value, the effect of deviations in the pressure waveform caused by changes in the outside ambient temperature and the effect of variation in the reference pressure (atmospheric pressure) can be reduced and the accuracy of the diagnosis can be increased because a sufficiently large pressure decrease is ensured to occur as the fuel temperature falls thereafter.

Assuming all other conditions are identical, the rate of change in the purge line pressure P decreases as the volume of empty space inside the fuel tank 5 increases. With this embodiment, however, the accuracy of the diagnosis can be held constant regardless of the volume of empty space in the fuel tank 5 by setting the threshold value PS0 used for the leakage determination in a variable manner such that the larger the volume of the empty space inside the fuel tank 5 is, the smaller the value to which the threshold value PS0 is set.

Since the diagnosis time is not allowed to exceed a prescribed time A, the electric power consumption can be held to a prescribed value or lower.

Since the diagnosis is executed when the engine is stopped, a highly accurate diagnosis that is not affected by sloshing can be accomplished and a chance to purge fuel vapor while the engine 1 is running is not lost due to the diagnosis.

As used herein to describe the above embodiment, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fuel vapor treatment system comprising:

a canister configured to temporarily adsorb fuel vapor from a fuel tank;

a fresh air introducing port fluidly connected to the canister to introduce fresh air into the canister with a fresh air introducing port on/off valve disposed in the fresh air introducing port to open and close the intake air introducing port of the canister;

a purge line fluidly connected to the canister to send the fuel vapor adsorbed in the canister to an air intake system of an internal combustion engine by introducing fresh air into the canister through the fresh air introducing port and allowing the fresh air and fuel vapor to be drawn into the air intake system through a purge control valve disposed in the purge line;

a pressure detecting device arranged and configured to detect a purge line pressure within the purge line; and a leak diagnosis control device configured and arranged to operatively control the purge control valve and the fresh air introducing port on/off valve so as to close the purge control valve and the fresh air introducing port on/off valve to close off the purge line after determining engine operation is stopped, the leak diagnosis control device including a pressure decrease rate calculating section configured to calculate a purge line pressure decreasing rate at which the purge line pressure decreases in accordance with a temperature decrease occurring after the engine is stopped; and a leak diagnosing section configured to conduct a leak determination to determine a leakage state of the purge line based on the purge line pressure decreasing rate of the purge line pressure.

2. The fuel vapor treatment system recited in claim 1, wherein the leak diagnosing section is further configured to determine that the purge line is not leaking when the purge line pressure decreasing rate is larger than a threshold value and determine that the purge line is leaking when the purge line pressure decreasing rate is equal to or smaller than the threshold value.

3. The fuel vapor treatment system recited in claim 2, wherein the leak diagnosing section is further configured to set the threshold value in a variable manner based on the volume of empty space inside the fuel tank.

4. The fuel vapor treatment system recited in claim 2, wherein the leak diagnosing section is further configured to conduct the leak determination only when a maximum value occurring in the purge line pressure immediately after closing off the purge line is equal to or higher than a prescribed value.

5. The fuel vapor treatment system recited in claim 2, wherein the leak diagnosing section is further configured to conduct the leak determination only when a difference between a fuel temperature and an outside ambient temperature, which exists when the engine is stopped, is equal to or above a prescribed value.

6. The fuel vapor treatment system recited in claim 2, wherein the leak diagnosing section is further configured to conduct the leak determination by comparing the purge line pressure decreasing rate to a threshold value, the purge line pressure is set to a pressure that is offset slightly toward a positive side relative to atmospheric pressure.

7. The fuel vapor treatment system recited in claim 6, wherein the leak diagnosing section is further configured to set the threshold value in a variable manner based on the volume of empty space inside the fuel tank.

8. The fuel vapor treatment system recited in claim 1, wherein the leak diagnosing section is further configured to conduct the leak determination only when a difference between a fuel temperature and an outside ambient temperature, which exists when the engine is stopped, is equal to or above a prescribed value.

9. The fuel vapor treatment system recited in claim 8, wherein the leak diagnosing section is further configured to set the threshold value in a variable manner based on the volume of empty space inside the fuel tank.

10. The fuel vapor treatment system recited in claim 1, wherein the leak diagnosing section is further configured to conduct the leak determination only when a maximum value occurring in the purge line pressure immediately after closing off the purge line is equal to or higher than a prescribed value.

11. The fuel vapor treatment system recited in claim 10, wherein the leak diagnosing section is further configured to conduct the leak determination by comparing the purge line pressure decreasing rate to a threshold value, the purge line pressure is set to a pressure that is offset slightly toward a positive side relative to atmospheric pressure.

12. The fuel vapor treatment system recited in claim 10, wherein the leak diagnosing section is further configured to set the threshold value in a variable manner based on the volume of empty space inside the fuel tank.

13. The fuel vapor treatment system recited in claim 10, wherein the leak diagnosing section is further configured to conduct the leak determination only when a difference between a fuel temperature and an outside ambient temperature, which exists when the engine is stopped, is equal to or above a prescribed value.

14. A fuel vapor treatment system comprising:

adsorbing means for temporarily adsorbing fuel vapor evaporated from a fuel tank;

fresh air introducing means for selectively introducing and stopping fresh air into the adsorbing means;

purging means for regulating fuel vapor flows from the adsorbing means to an air intake system of an internal combustion engine by introducing fresh air into the adsorbing means via the fresh air introducing means and allowing the fresh air and fuel vapor to be drawn into the air intake system through the purging means;

pressure detecting means for detecting purge line pressure inside the purging means; and leak diagnosis control means for closing the purging means and the fresh air introducing means to close off a portion of the fuel vapor treatment system between the air intake system and the adsorbing means after determining engine operation is stopped, for calculating a purge line pressure decreasing rate at which the purge line pressure decreases in accordance with a temperature decrease occurring after the engine is stopped, and for conducting a leak diagnosis to determine a leakage state of the purging means based on the purge line pressure decreasing rate of the purge line pressure.

15. A method for diagnosing a fuel vapor treatment system having a canister disposed between a fuel tank and an air intake system of an internal combustion engine with a purge line that leads from the canister to the air intake system and a fresh air introducing port that allow fresh air and fuel vapor to be drawn into the air intake system, the method comprising:

detecting pressure inside a purge line pressure within the purge line of the fuel vapor treatment system having a fuel tank fluidly connected to an intake passage of an internal combustion engine with a canister that is configured to adsorb fuel vapor from the fuel tank;

closing a purge control valve and a fresh air introducing port on/off valve to close off the purge line after determining engine operation is stopped;

calculating a purge line pressure decreasing rate at which the purge line pressure decreases in accordance with a temperature decrease occurring after the engine is stopped; and conducting a failure diagnosis on the fuel vapor treatment system to determine a leakage state of the purge line based on the purge line pressure decreasing rate of the purge line pressure.

* * * * *